Sept. 1, 1964
R. W. ANDERSEN
3,146,894
FRICTION SHOCK ABSORBING MECHANISMS
Filed Oct. 22, 1962
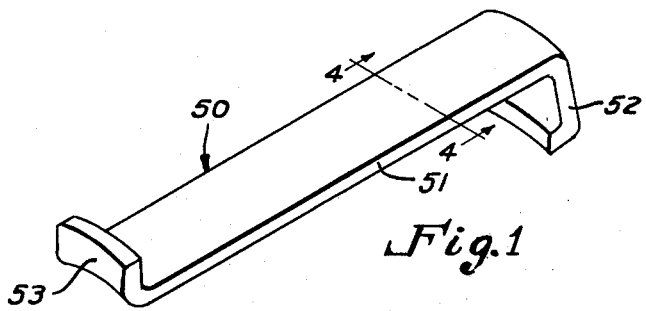
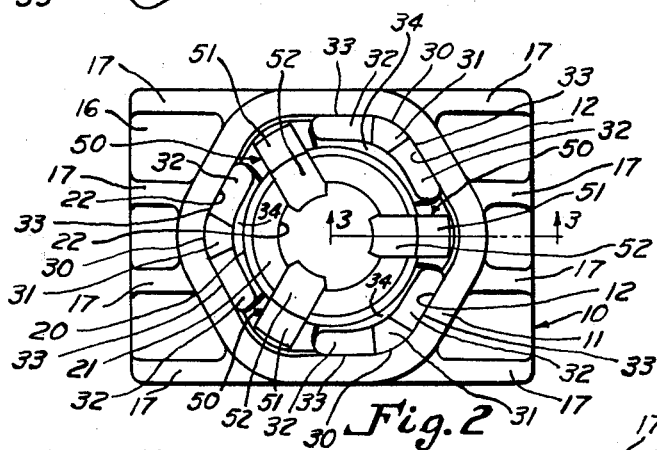
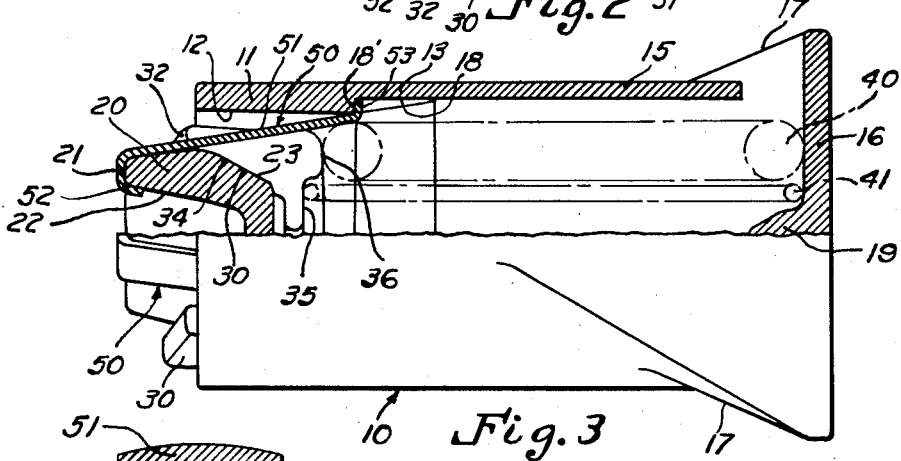
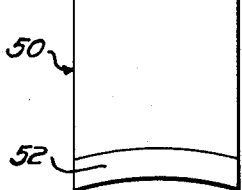
INVENTOR.
Robert W. Andersen
BY
Atty.

United States Patent Office 3,146,894
Patented Sept. 1, 1964

3,146,894
FRICTION SHOCK ABSORBING MECHANISMS
Robert W. Andersen, La Grange, Ill., assignor to W. H. Miner, Inc., Chicago, Ill., a corporation of Delaware
Filed Oct. 22, 1962, Ser. No. 231,979
15 Claims. (Cl. 213—32)

This invention relates to improvements in friction shock absorbing mechanisms, or draft gears for railroad vehicles, and more particularly to means for maintaining such mechanisms in assembled relationship prior to installation thereof.

A popular form of friction shock absorber or draft gear that has existed for some time comprises a wedge surrounded by a plurality of friction shoes that are in turn received in a cylindrical casing. Springs within the casing urge the wedge and shoes into protruding relationship with the open front end of the casing. The entire unit is adapted for installation in a "pocket" such as is provided in railway draft riggings. When in use, the wedge and casing are held in place between front and rear followers that define the pocket; but prior to installation other means must be provided to maintain the assembled relationship of the gear parts. Commonly, inwardly projecting lugs are provided at the front of the casing, and matching outwardly projecting lugs are provided on the wedge. In the assembled gear, each pair of matching lugs is urged into engagement by the action of the springs on the shoes and wedge, and each such pair of lugs is disposed between adjacent shoes to prevent relative rotational displacement that might disengage the lugs.

In the above type of draft gear the diametrical size of the spring that may be inserted in the casing through its open end is limited by the inward projection of the casing lugs. In addition, the fabrication of the wedge and casing is complicated by the necessity of providing the lugs. For these and other reasons, an economical and effective retaining means that would permit the elimination of these lugs and permit the use of a maximum diameter spring, with its attendant higher spring capacity, has been considered desirable. Finally, the present invention, and in particular the preferred embodiment thereof which is herein illustrated and described, has provided a solution to the problem.

Therefore, it is an object of this invention to provide a friction shock absorbing mechanism, especially adapted for railway draft riggings, comprising a friction casing, friction shoes slidingly telescoped within the casing, a pressure transmitting wedge having wedging engagement with the shoes to spread the same apart, and spring means within the casing yieldingly resisting inward movement of the shoes, wherein retaining means are provided for the wedge in the form of elongated strap members having outer ends which are engageable with the wedge and resilient inner ends which are engageable in recesses formed in the inner wall surface of the casing.

A more general object of this invention is to provide a friction draft gear of the wedge and shoe type in which maximum clearance is provided for the insertion, through the open end of the casing, of springs or other parts into the casing.

Another object of this invention is to provide simple and effective means of retaining the various parts of a draft gear of the class above described in assembled relationship primarily during assembly and shipment thereof and prior to installation of the gear in a railway vehicle.

A further object of the present invention is to provide an effective retaining means for the wedge of such draft gear that facilitates quick assembly of the gear.

Another more detailed object of this invention is to provide a wedge retaining means of the character described which includes a series of separate elongated steel strap members, the outer ends of which are formed for engagement with the wedge and the inner ends of which are formed for engagement with notches or shoulders provided on the inner surface of the casing.

Still another object of this invention is to provide separate steel strap members of the character described which may be readily formed by stamping or forging operations with a minimum waste of material and which may be transversely bowed to increase the strength and rigidity thereof.

An additional object of this invention is to provide an economical, easily assembled, and trouble-free shock absorbing mechanism with high maximum capacity and low space requirements for use in railway draft riggings or the like.

Still other and further objects of the present invention will be obvious to a person skilled in the art upon examination of the accompanying drawings and reading of the specification and claims following hereinafter.

In the drawings:

FIGURE 1 is a perspective view of one of the strap members of the wedge retaining means according to this invention;

FIGURE 2 is an elevational end view of an assembled draft gear as seen from the open end of the friction casing;

FIGURE 3 is a bottom plan view of the assembled draft gear, the upper half of the figure being a sectional view taken along the section line 3—3 of FIGURE 2; and FIGURE 4 is a transverse sectional view through one of the strap members of the wedge retaining means taken along the section line 4—4 of FIGURE 1.

Referring now in greater detail to the drawings, in which like numerals designate like elements, a generally cylindrical casing or housing 10 of hexagonal cross section (FIGURE 2) serves as a friction shell and spring cage for cooperation with a wedge 20, three friction shoes 30, 30, 30, two springs 40 and 41 (FIGURE 3), and wedge retaining means in the form of three separate elongated strap members 50.

The casing 10, which is open at one end and closed at its opposite end, is formed adjacent its open end with a thick-walled front section or friction shell 11 of rounded hexagonal cross section, the inner friction surfaces 12 of the shell 11 tapering slightly from its open outer end and converging in a direction toward the closed end of the casing 10. Inwardly of the friction shell 11 and integral therewith is a transition wall section 13 wherein the inner surface of the casing 10 diverges in a direction toward the closed end of the casing whereby the wall thickness diminishes and tapers into a rear wall section 15 of uniformly thinner wall thickness. Eight horizontally oriented fins 17 (as in FIGURE 2) emerge from the outer surfaces of the rear wall section 15 and angle outwardly to support an enlarged rectangular end wall 16 which serves as a closure at that end of the casing. The end wall 16 is thus suitably laterally extended and reinforced to adapt it to function as one of the followers of the mechanism. Three circumferentially spaced wedge-shaped notches 18 (FIGURE 3) are provided on the inner surface of the transition wall section 13 in such manner as to provide narrow forward extensions of the thin-walled rear section 15 and narrow radial shoulders 18' which are generally in alignment with the inner end of the friction shell 11. A protrusion 19 which projects inwardly of the casing 10 from the center of the end wall 16 is provided to receive and position the spring 41.

The outer end portion of the wedge 20 is generally circular in cross section with the sides thereof diverging in a direction inwardly of the casing 10 in a manner such that a rounded hexagonal cross section is defined approximately midway between its inner and outer ends. The outer end surface of the wedge 20 is flat and provided with a centrally located, generally cup-shaped recess 22 whereby a flat peripheral rim 21 is defined at the outer end of the wedge 20. The inner end portion of the wedge 20 comprises six circumferentially arranged friction surfaces 23 which converge sharply in a direction inwardly of the casing 10 and are constantly engaged with the shoes 30, 30, 30.

The three circumferentially spaced friction shoes 30, 30, 30 are disposed between the wedge 20 and the friction shell 11 with the shoes defining an outwardly opening pocket for receiving the inner end of the wedge. In operation, as the wedge 20 moves axially inwardly of the casing 10, the shoes slide inwardly along the friction surfaces 12 of the shell 11 and along the friction surfaces 23 of the wedge 20. Each shoe 30 has a generally flat outermost surface 31 (FIGURE 2) which is flanked by two rearwardly slanting wing portions 32 having outer friction surfaces 33 which frictionally mate with adjacent complementary surfaces 12 of the friction shell 11. Inner friction surfaces 34 of the shoes mate with the generally complementary friction surfaces 23 of the wedge 20. The inner end surfaces of the shoes are recessed at 35 to provide a seat for the spring 41 and at 36 to provide a seat for the spring 40.

The spring 40 has an outer diameter only slightly less than the inner diameter of the friction shell 11 and is maintained in a precompressed condition between the end wall 16 and the shoes 30, 30, 30. The spring 41, which is of a smaller diameter, is nested coaxially within the spring 40. It, too, is constantly in compression between the end wall 16 and the shoes 30, 30, 30.

The three separate elongated steel strap members 50 of the wedge retaining means may be readily formed by conventional stamping or forging operations with a minimum waste of material. For increased strength and rigidity, the strap members 50 are preferably transversely bowed, as best illustrated in FIGURE 4. Each strap member 50 is characterized by an elongated body portion 51 having a width which is less than the distance between the circumferentially spaced friction shoes 30, 30, 30, by a reversely bent outer end portion 52 which is formed for engagement over the peripheral rim 21 of the wedge 20, and by a flange portion 53 at its inner end which extends radially outwardly relative to the longitudinal axis of the casing 10 when the strap member 50 is assembled in the draft gear as illustrated in FIGURE 3. In the assembled draft gear, the elongated body portion 51 of each strap member 50 extends inwardly of the casing 10 alongside the wedge 20 and at a slight angle away from the longitudinal axis of the casing 10 with the inner end portion thereof being sufficiently elastic that its flange portion 53 is engageable in one of the notches 18 formed in the tapered transition wall section 13. When the outer end portions 52 of the strap members 50 are engaged over the peripheral rim 21 of the wedge 20, the flange portions 53 thereof are urged against the shoulders 18' defined by the notches 18 as a result of the biasing actions of the springs 40 and 41 through the shoes 30, 30, 30 and the wedge 20. The three strap members 50, 50, 50 thus serve to retain the wedge 20 and the shoes 30, 30, 30 in assembled relationship in the casing 10 primarily during assembly and shipment of same prior to its installation in a draft gear rigging.

To assemble the gear, the springs 40 and 41 are first inserted in the casing 10. Then the friction shoes 30, 30, 30 are positioned 120 degrees apart within the casing, each nestled in a corner of the hexagonal friction shell 11. The shoes are then depressed into the casing against the spring resistance while the wedge 20 and the three strap members 50, 50, 50 are inserted. The inner ends of the strap members 50 are urged radially inward to pass through the friction shell 11 until the flange portions 53 at the inner ends thereof are opposite the notches 18. At that point the flange portions 53 are permitted to resiliently move radially outward into the notches 18 for engagement with the shoulders 18' when the shoes are released and allowed to move outwardly of the casing 10. The shoes 30, 30, 30, their wing portions 32, and the body portions 51 of the strap members 50 are so proportioned that the strap members 50 pass or extend between adjacent shoes and do not interfere with the sliding action of the shoes. As shown in FIGURE 2, the clearance between the strap members 50 and the shoes 30 is ample.

The strap members 50 may be readily disassembled from the draft gear to facilitate inspection and service of same by flexing the inner ends thereof radially inward, by means of a suitable tool (not shown), to disengage the flange portions 53 from the shoulders 18'.

It should be noted that the notches 18 are positioned sufficiently inwardly of the outer open end of the casing 10 that they do not reduce the wall thickness where it is required for strength purposes. The large radial outward forces developed by the shoes 30, 30, 30 on the shell 11 in response to high shock loads on the outer end of the wedge 20 are resisted by a friction shell 11 of unbroken and almost uniform thickness as a result of the notches 18 being positioned inwardly of the friction bore surfaces 12. If desired, a continuous 360° shoulder could be substituted for the circumferentially spaced shoulders 18' defined by the notches 18. During operation of the draft gear, the strap members 50 may slide back and forth with the wedge 20. In this regard, the normal unstressed orientation of the ends of the flange portions 53 of the strap members 50 should be such that the radial distance thereof from the longitudinal axis of the casing 10 is greater than the radii of the friction shell surface 12 but less than the radius of the thin-walled section 15 whereby to prevent resilient contact between the flange portions 53 and the inner wall surfaces of the casing 10 and thus minimize wear of the parts.

As can be seen in FIGURE 3, the outer spring 40 extends sufficiently toward the outer end of the casing 10 to abut the inner surfaces of the inner ends of the strap members 50 and provide additional security against their being jarred inwardly and disengaged from their shoulders 18' or from within the notches 18. Further, the shoulders 18' may be slightly inclined toward the open end of the casing 10 from their inner edges and the flange portion 53 may correspondingly be disposed generally normal to their body portion 51 to provide more positive retention of the inner ends of the strap members 50 in the notches 18.

Thus, the hereinbefore described mechanism can be seen to permit easy assembly, to allow the use of spring diameters limited only by the inner diameter of the friction shell, to permit simplification of the casing and wedge castings, to provide high capacity for its overall size and weight, to supply reliable maintenance of the assembled orientation during shipping and prior to installation, and to avoid troubles that might arise from interference of the pre-installation, assembly-retaining means with the post-installation operating conditions.

It is obvious that numerous changes and modifications in the described mechanism might be made without departing from the spirit or scope of the present invention, and it is not intended to limit the coverage of the appended claims to the details of the foregoing disclosure.

What is claimed is:

1. Friction shock absorbing mechanism comprising, in combination, a generally cylindrical casing having a closed end and an open end, a series of circumferentially spaced friction shoes slidingly telescoped in the open outer end of said casing, a central wedge disposed in an outwardly opening pocket defined by said series of friction shoes, a centrally located recess formed in the outer surface of said wedge and defining a peripheral rim at the outer end of said wedge, a series of circumferentially spaced, inwardly facing shoulders formed on the inner surface of said casing inwardly of the open outer end thereof, spring means in said casing seated between said closed end thereof and inner surface portions of said friction shoes and normally urging said shoes and said wedge outwardly of said casing, and means for retaining said shoes and said wedge in assembled relationship in said casing primarily during assembly and shipment of the friction shock absorbing mechanism prior to installation thereof in a railway draft rigging, said retaining means being characterized by a series of elongated strap members having outer end portions engaged over said outer peripheral rim of said wedge and inner end portions disposed in latching engagement with said shoulders formed on the inner surface of said casing.

2. Mechanism as set forth in claim 1 wherein said elongated strap members are each characterized by a transversely bowed configuration which serves to strengthen and rigidify same.

3. Friction shock absorbing mechanism comprising, in combination, a generally cylindrical casing having a closed end and an open end, a series of circumferentially spaced friction shoes slidingly telescoped in the open outer end of said casing, a central wedge disposed in an outwardly opening pocket defined by said series of friction shoes, a centrally located recess formed in the outer surface of said wedge and defining a peripheral rim at the outer end of said wedge, a series of circumferentially spaced, inwardly facing shoulders formed on the inner surface of said casing inwardly of the open outer end thereof, spring means in said casing seated between said closed end thereof and inner surface portions of said friction shoes and normally urging said shoes and said wedge outwardly of said casing, and means for retaining said shoes and said wedge in assembled relationship in said casing primarily during assembly and shipment of the friction shock absorbing mechanism prior to installation thereof in a railway draft rigging, said retaining means being characterized by a series of strap members having reversely bent outer end portions engaged over said outer peripheral rim of said wedge, elongated body portions which extend inwardly of said casing alongside said wedge, and flange portions which project radially outwardly from the inner ends of said body portions, said flange portions being radially yieldable and being normally disposed in latching engagement with said shoulders formed on the inner surface of said casing.

4. Friction shock absorbing mechanism comprising, in combination, a generally cylindrical casing having a closed end and an open end, a series of three circumferentially spaced friction shoes slidingly telescoped in the open outer end of said casing, a central wedge disposed in an outwardly opening pocket defined by said three friction shoes, a centrally located recess formed in the outer surface of said wedge and defining a peripheral rim at the outer end of said wedge, a series of three circumferentially spaced notches formed in the inner surface of said casing inwardly of the open outer end thereof and defining three inwardly facing shoulders, spring means in said casing seated between said closed end thereof and inner surface portions of said friction shoes and normally urging said shoes and said wedge outwardly of said casing, and means for retaining said shoes and said wedge in assembled relationship in said casing primarily during assembly and shipment of the friction shock absorbing mechanism prior to installation thereof in a railway draft rigging, said retaining means being characterized by a series of three separate circumferentially spaced elongated strap members each of which has a width less than the spacing between said circumferentially spaced friction shoes and each of which extends into the outer open end of said casing alongside said wedge and between adjacent ones of said friction shoes, said strap members being characterized by reversely bent outer end portions engaged over said outer peripheral rim of said wedge and by flange portions which project radially outwardly from the inner ends thereof, said flange portions being radially yieldable and normally being disposed in said notches formed on the inner surface of said casing in latching engagement with said shoulders thereof.

5. Friction shock absorbing mechanism comprising, in combination, a generally cylindrical casing having a closed end and an open end, said casing being characterized by a thick-walled friction shell section adjacent its open end, by an intermediate wall section tapered on its inner surface, and by a thin-walled section which extends between said tapered wall section and said closed end of said casing, a series of circumferentially spaced friction shoes slidingly telescoped in said thick-walled friction shell section at the open outer end of said casing, a central wedge disposed in an outwardly opening pocket defined by said series of friction shoes, a centrally located recess formed in the outer surface of said wedge and defining a peripheral rim at the outer end of said wedge, a series of circumferentially spaced notches formed in said tapered wall section of said casing with each of said notches defining an inwardly facing shoulder, spring means in said casing seated between said closed end thereof and inner surface portions of said friction shoes and normally urging said shoes and said wedge outwardly of said casing, and means for retaining said shoes and said wedge in assembled relationship in said casing primarily during assembly and shipment of the friction shock absorbing mechanism prior to installation thereof in a railway draft rigging, said retaining means being characterized by a series of elongated strap members having outer end portions engaged over said outer peripheral rim of said wedge and inner end portions provided with flanges which project radially outwardly into said notches for latching engagement with said shoulders thereof, said flanges being yieldable radially inwardly relative to the longitudinal axis of said casing.

6. The combination set forth in claim 5 wherein said spring means is of a diameter only slightly less than the inner diameter of said thick-walled outer section of said casing.

7. The combination set forth in claim 5 wherein said inner ends of said strap members when in their normal unstressed condition are disposed a radial distance from the longitudinal axis of said casing which is greater than the inner radius of said thick-walled section of said casing but less than that of said notches.

8. In a friction shock absorbing mechanism having a casing open at one end, a plurality of friction shoes slidingly telescoped in the open end of the casing, a central wedge in wedging engagement with the shoes outwardly thereof and resilient means within the casing urging the wedge and shoes in an outward direction; retaining means for limiting the outward movement of said wedge and shoes primarily during assembly and shipment of the shock absorbing mechanism prior to installation thereof in a railway draft rigging, said retaining means comprising a plurality of elongated resilient strap members characterized by outer end portions engageable with said wedge, by main body portions extendable into the open end of said casing alongside said wedge, and by inner end portions provided with flanges which project generally radially toward an inner wall surface of said casing having an inner diameter greater than that of said open end of said casing, said inner wall surface of said casing being notched for latchingly receiving said inner end flanges of said strap members whereby to restrain said retaining means and thus said wedge and shoes from outward movement with respect to said casing.

9. In a friction shock absorbing mechanism having a casing open at one end, a plurality of friction shoes slidingly telescoped in the open end of the casing, a wedge in wedging engagement with the shoes outwardly thereof, and resilient means within the casing urging the wedge and shoes in an outward direction; means for retaining said wedge and said shoes in said casing primarily during assembly and shipment of the shock absorbing mechanism prior to installation thereof in a railway draft rigging, said retaining means comprising a plurality of elongated resilient strap members extending alongside said wedge into said casing and having outer end portions positively engaging the outer surface of said wedge, said casing being provided on its inner surface with a plurality of internal notch-like shoulder configurations spaced from its outer end and with the radial distance thereof from the longitudinal axis of the casing being greater than the inner radius of said open end of said casing, and flange means formed on the inner end of each of said strap members and adapted for latching engagement with said shoulder configurations whereby to limit the outward movement of said retaining means and thus said wedge and said shoes with respect to said casing.

10. Mechanism as set forth in claim 9 wherein said shoes are circumferentially spaced apart sufficiently to permit said strap members to extend therebetween into said casing, said shoes thereby serving to limit rotational movement of said strap members relative to said casing.

11. Friction shock absorbing mechanism comprising a generally cylindrical casing open at one end, said casing having a thick-walled section adjacent said open end, an intermediate wall section tapered on its inner surface, and a thin-walled section adjacent its opposite closed end; a plurality of friction shoes mounted within said thick-walled section for sliding engagement with respect thereto, a wedge protruding from said open end and positioned for wedging engagement with said shoes outwardly thereof, spring means within said casing urging said shoes and said wedge in an outward direction, and separate assembly-retaining means operably engaged between said wedge and said casing to limit outward movement of said wedge with respect to said casing, said tapered intermediate wall section having a plurality of notch-like shoulders formed therein and said assembly-retaining means being characterized by a corresponding plurality of strap members which extend inwardly of said casing from engagement with the outer end of said wedge, the inner end of each of said strap members being adapted for positive latching engagement with its corresponding notch-like shoulder.

12. The combination set forth in claim 11, wherein said spring means is of an outer diameter only slightly less than the inner diameter of said thick-walled outer section of said casing.

13. The combination set forth in claim 11, wherein the inner ends of said strap members are elastically flexible radially of said casing.

14. Friction shock absorbing mechanism comprising a generally cylindrical casing open at one end, said casing having a thick-walled section adjacent its open end, an intermediate wall section tapered on its inner surface, and a thin-walled section adjacent its opposite closed end; a plurality of friction shoes mounted within said thick-walled outer section of said casing for sliding engagement with respect thereto, a wedge protruding from said open end of said casing and positioned for wedging engagement with said shoes outwardly thereof, spring means within said casing urging said shoes and said wedge in an outward direction, and separate elongated assembly-retaining means operably engaged between said wedge and said casing to limit outward movement of said wedge with respect to said casing, said tapered wall section having at least one area of reduced wall thickness defining an inwardly facing inner shoulder, the outer extremity of said assembly-retaining means being formed to mate with and engage the outer end of said wedge and the inner extremity of said assembly-retaining means being formed to mate with and engage said casing shoulder, said inner extremity diverging from the axis of said casing in its normal unstressed orientation to a radial distance greater than the radius of said thick-walled section but less than that of said reduced wall thickness area.

15. A friction shock absorbing mechanism comprising, in combination, a casing open at one end, a plurality of friction shoes slidingly telescoped in said one end of the casing, a central wedge in wedging engagement with outer surface portions of said shoes, a coil spring within the casing normally urging said wedge and shoes outwardly thereof, notch-like shoulder means formed on the inner surface of said casing inwardly of said open end thereof with the radial distance thereof from the longitudinal axis of the casing being greater than the inner radius of said open end of said casing, and retaining means for limiting the outward movement of said wedge characterized by one or more elongated strap members having outer end portions engageable with outer surface portions of said wedge and body portions extending inwardly of said casing, the inner end of each of said strap members being yieldable radially of said casing and being provided with an outwardly projecting flange adapted for shouldered engagement with said shoulder means in said casing, the inner surfaces of the inner ends of said strap members being engaged by the outermost end coil of said spring to aid in preventing inward radial yielding thereof and thus to aid in retaining said flanges in shouldered engagement with said shoulder means in said casing.

References Cited in the file of this patent
UNITED STATES PATENTS

| | | |
|---|---|---|
| 1,587,471 | Caples | June 1, 1926 |
| 2,411,956 | Dath | Dec. 3, 1946 |
| 2,713,425 | Tucker | July 19, 1955 |